(12) United States Patent
Martínez Corral et al.

(10) Patent No.: US 11,933,676 B2
(45) Date of Patent: Mar. 19, 2024

(54) MICROSCOPE FOR QUANTITATIVE WAVEFRONT MEASUREMENTS, MICROSCOPE MODULE AND KIT, METHOD AND COMPUTER PROGRAM FOR COMPUTATIONAL WAVEFRONT RECONSTRUCTION

(71) Applicant: UNIVERSITAT DE VALÈNCIA, Valencia (ES)

(72) Inventors: Manuel Martínez Corral, Valencia (ES); Genaro Saavedra Tortosa, Valencia (ES); Emilio Sánchez Ortiga, Valencia (ES); Peter Török, Valencia (ES)

(73) Assignee: UNIVERSITAT DE VALÈNCIA, Valencia (ES)

( * ) Notice: Subject to any disclaimer, the term of this patent is extended or adjusted under 35 U.S.C. 154(b) by 372 days.

(21) Appl. No.: 17/429,834

(22) PCT Filed: Feb. 14, 2020

(86) PCT No.: PCT/ES2020/070101
§ 371 (c)(1),
(2) Date: Aug. 10, 2021

(87) PCT Pub. No.: WO2020/165481
PCT Pub. Date: Aug. 20, 2020

(65) Prior Publication Data
US 2022/0128412 A1 Apr. 28, 2022

(30) Foreign Application Priority Data
Feb. 15, 2019 (ES) .................................. 201930116

(51) Int. Cl.
*G02B 21/06* (2006.01)
*G01J 9/00* (2006.01)
*G02B 21/36* (2006.01)

(52) U.S. Cl.
CPC ................ *G01J 9/00* (2013.01); *G02B 21/06* (2013.01); *G02B 21/365* (2013.01)

(58) Field of Classification Search
CPC ......... G01J 9/00; G02B 21/06; G02B 21/365; G02B 21/086; G02B 21/361; G02B 30/10; G02B 3/0056; G02B 21/36
See application file for complete search history.

(56) References Cited

U.S. PATENT DOCUMENTS 9,658,443 B2  5/2017 Broxton et al.
9,679,360 B2  6/2017 Fleischer et al.
(Continued)

FOREIGN PATENT DOCUMENTS

WO    2014/018584    7/2013

OTHER PUBLICATIONS

International Search Report issued in PCT/ES2020/070101, dated Jun. 2, 2020.

*Primary Examiner* — Jonathan M Hansen
(74) *Attorney, Agent, or Firm* — ICE MILLER LLP

(57) ABSTRACT

The present invention relates to a microscope for quantitative measurements of the wavefront, comprising:
  means for the illumination of a sample (T);
  an objective lens (2);
  an ordered two-dimensional arrangement of lenses (3), with a spacing $p_\mu$ greater than 500 μm and a relative aperture of less than 10;
  an image sensor (4) located in a capture space (Ec) to receive the light scattered by the sample (T), and to acquire spatial and angular information on the object wavefront associated therewith; and (Continued)

a computational entity to perform a computational reconstruction of the object wavefront from the spatial and angular information.

Other aspects of the invention relate to a method, a computer program and a product incorporating the same, adapted for the performance of the functions of the computational entity of the microscope, as well as to a module and a kit for a microscope.

21 Claims, 5 Drawing Sheets

(56) References Cited

U.S. PATENT DOCUMENTS

| | | | |
|---|---|---|---|
| 9,726,875 B2 | 8/2017 | Raghunathan | |
| 9,976,911 B1* | 5/2018 | Tabirian | G01J 1/0411 |
| 2010/0309457 A1* | 12/2010 | Cui | G01J 9/0215 |
| | | | 356/121 |
| 2012/0268717 A1* | 10/2012 | Zhou | A61B 3/12 |
| | | | 351/221 |
| 2014/0263963 A1 | 9/2014 | Broxton et al. | |
| 2014/0334745 A1 | 11/2014 | Fleischer et al. | |
| 2016/0062100 A1 | 3/2016 | Cohen et al. | |
| 2017/0205615 A1* | 7/2017 | Vaziri | G02B 21/0072 |
| 2018/0203217 A1 | 7/2018 | Knebel et al. | |

* cited by examiner

MICROSCOPE FOR QUANTITATIVE WAVEFRONT MEASUREMENTS, MICROSCOPE MODULE AND KIT, METHOD AND COMPUTER PROGRAM FOR COMPUTATIONAL WAVEFRONT RECONSTRUCTION

CROSS-REFERENCE TO RELATED PATENT APPLICATIONS

This is a U.S. National Phase Application under 35 U.S.C. § 371 of International Patent Application No. PCT/ES2020/070101, filed Feb. 14, 2020, and claims priority to Spanish Patent Application No. P201930116, filed Feb. 15, 2019, which is incorporated by reference in its entirety. The International Application was published on Aug. 20, 2020 as International Publication No. WO 2020/165481 A1.

FIELD OF THE INVENTION

The present invention relates, in a first aspect, to a microscope for quantitative measurements of the wavefront, comprising an ordered two-dimensional arrangement of lenses designed in such a way that it enables the measurement of slight and non-slight variations in the wavefront from biological samples, or the obtaining of high-resolution 3D images, including those from microscopic samples.

A second aspect of the present invention relates to a method for the computational reconstruction of the wavefront, adapted to perform the functions for which the computational entity of the microscope is configured.

In a third aspect, the present invention relates to a computer program for the computational reconstruction of the wavefront, including program instructions which, when executed in a processor, implement the method of the second aspect.

In a fourth aspect, the present invention relates to a computer program product comprising a tangible medium in which the computer program of the third aspect is stored.

A fifth aspect of the present invention relates to a module for a microscope, to be coupled to a camera port of a microscope, in order to construct the microscope of the first aspect of the present invention.

A sixth aspect of the present invention relates to a kit for a microscope, comprising the module of the fifth aspect and an illumination module to be coupled to an illumination port of a microscope.

BACKGROUND OF THE INVENTION

The computational reconstruction of the wavefront is an issue of particular interest in optical microscopy, as it provides information on the light field emitted by 3D samples, i.e., quantitative measurements of the wavefront. Currently, this type of reconstruction is provided by two types of microscope:

1) Microscopes based on the interferential detection of the wavefront by means of a holographic process. This type of systems presents the disadvantage of its low stability and that of obtaining only monocular information.

2.) Microscopes with a structure similar to that of the wavefront sensors based on the Hartmann-Shack (H-S) principle. That is, those which include the characteristics defined in the preamble of claim 1 of the present invention. Such is the case of those disclosed in the following patents: U.S. Pat. No. 9,726,875B2, U.S. Pat. No. 9,658,443B2, U.S. Pat. No. 9,679,360B2 and U.S. Pat. No. 9,976,911 B2.

In said patents, different techniques are proposed, aimed at obtaining a spatial resolution which is, in U.S. Pat. No. 9,726,875B2, at least acceptable for the obtaining of a good approximation of the real light fields, this being, in U.S. Pat. No. 9,658,443B2, increased but limited by the diffraction limit which is, in U.S. Pat. No. 9,679,360B2, improved by the obtaining of a composite image combining a spatial intensity image with a light field image, or which is, in U.S. Pat. No. 9,976,911 B2, good but without negatively affecting the angular resolution, i.e. meeting a compromise between spatial and angular resolution.

Although each of the proposals made in said patents achieves a certain improvement in the spatial resolution of the microscopes proposed therein, said improvement clearly leaves room for further improvement, as the improvement in spatial resolution achieved has the limitations of the systems based on Hartmann-Shack sensors, the resolution whereof is limited by the number of microlenses (independently of the spatial resolution of the pixelated sensor). Consequently, in order to optimise an H-S sensor, the greatest number possible of microlenses must be used, whose size must therefore be reduced to a minimum. However, there are two main limitations to said process:

1) The size of the diffraction spot: By illuminating a microlens with a locally plane wave, the light is focused on the sensor (located on the image focal plane of the microlens), forming a diffraction spot. The position of this spot with regard to the centre of the microlens can be related with the angle of inclination of the locally plane wave. The diameter of the spot, $\phi_{dif}$, for a particular illumination wavelength, $\lambda$, is related with the diameter, d, and the focal length of each microlens, f, by means of the following formula:

$$\phi_{dif} = \frac{\lambda}{NA} \quad (1)$$

where $$NA \approx \frac{d}{2f} \quad (2)$$

On the other hand, in order to be able to sample effectively the diffraction spot for the purpose of calculating its centroid and therefore the relative displacement thereof, said spot must occupy at least 4 pixels, according to the Nyquist criterion. In this case, a size of 4 pixels is the optimal value, as said value enables the effective sampling of the spot with the sensor and in turn, enables the number of wavefront angles determined by the displacement of the spot to be optimised.

$$4\Delta x = \phi_{dif} = 2\lambda \frac{f}{d} \quad (3)$$

The limitation entailed by this may be seen by entering typical values into the Ec. (3). For the case of a sensor with a pixel size of $\Delta x = 6$ μm, a wavelength of $\lambda = 0.5$ μm, and taking a typical value for the size of the microlens, $d = 100$ μm, the focal length that would optimise the sensor, according to the Ec. (3), is F=2.5 mm. Therefore, in this case, the microlenses must be located at 2.5 mm from the sensor.

Should the size of the microlenses be reduced, said value would be reduced proportionally, but this is possible from a practical point of view, as said focal length value is very close to the practical limit of both manufacture and alignment.

From these calculations it is simple to understand why a value of d=150 µm as the diameter of the microlenses and a focal length of approximately f=6 mm are generally used in the commercial models. Said diameter directly determines the spatial resolution of the system. Furthermore, said size limits the number of pixels in which the wavefront is sampled for a particular size of sensor. Generally, in commercial H-S, the number of microlenses, and therefore the number of pixels of the reconstruction, varies between 20×20 and 100×100 (corresponding to pixelated sensors whose total size is to be found in the range between 3.0×3.0 mm and, in extreme cases, 15.0×15.0 mm).

2) Angular Resolution.

For each locally plane wave, the maximum angle that can be sampled is related to the maximum displacement of the spot within its region. Given that the microlenses create optical barriers, said displacement corresponds to half the size of the microlenses, $$\sin e\theta_{max} = \frac{d}{2f}. \tag{4}$$

Therefore, if microlenses of d=150 µm and f=6 mm were used, the maximum measurable angle of the incident wavefront would be $\theta_{max}$=0.7°. This is why H-S sensors are normally used to measure slight variations in the wavefront, and their use in the measurement of the light scattered in biological samples is certainly limited.

The above reasoning shows why, in the best of cases, the commercial H-S do not measure inclinations of locally plane waves greater than $\theta_{max}$=1.0°.

On the other hand, the mechanisms proposed in the aforementioned patents based on the Hartmann-Shack principle present a certain complexity; it would therefore also be convenient to propose simpler alternative mechanisms.

It is therefore necessary to offer an alternative to the state of the art that covers the gaps found therein, by means of the provision of a microscope which, as in the aforementioned patents, is structurally similar to those based on the Hartmann-Shack principle, but yielding much better results regarding spatial resolution than those provided by the microscopes based on that principle in the state of the art, likewise a simplification thereof, and which likewise provides greater stability and robustness than those based on interferential procedures, and not solely monocular information.

SUMMARY OF THE INVENTION

To this end, the present invention relates, in a first aspect, to a microscope for quantitative measurements of the wavefront comprising, in a manner that is already known:
 illumination means for the illumination of a sample;
 a microscope objective lens configured and arranged to receive and focus the light scattered by the sample when illuminated by said illumination means;
 an ordered two-dimensional arrangement of lenses located at the aperture diaphragm of said microscope objective lens or at the location of an intermediate image thereof;
 an image sensor formed by a plurality of photodetector elements, located at a capture space on the focal plane of the ordered two-dimensional arrangement of lenses, to receive said light scattered by the sample subsequent to crossing said microscope objective lens and said ordered two-dimensional arrangement of lenses, and to acquire spatial information and angular information of the object wavefront associated with said light from said sample, several of said photodetector elements facing each lens; and
 at least one computational entity operatively connected to said image sensor, and configured and arranged to perform a computational reconstruction of said object wavefront based on said spatial and angular information.

Unlike the microscopes known in the state of the art, in that proposed by the first aspect of the present invention, the spacing $p_\mu$ between the centres of each two contiguous lenses of the ordered two-dimensional arrangement of lenses is greater than 500 µm and its relative aperture is less than 10.

In accordance with an embodiment, the spacing between the centres of each two contiguous lenses of the ordered two-dimensional arrangement of lenses has a value between 900 µm and 1100 µm and its relative aperture has a value between 5 and 7.

In a preferred embodiment, the spacing between the centres of each two contiguous lenses of said ordered two-dimensional arrangement of lenses has a value between 990 µm and 1010 µm, preferably 1000 µm, and its relative aperture has a value between 5.8 and 6.2, preferably 6.

The microscope proposed by the first aspect of the invention, due to the few components it includes and to the arrangement of those components, is highly compact and enables the measurement of the wavefront in microscopic 3D samples. Its implementation requires a minimal variation over the configuration of a conventional microscope. It can therefore be implemented on conventional microscopes with ease. As with Hartmann-Shack technology, this new microscope is based on the use of an array or ordered two-dimensional arrangement of lenses. However, the characteristics of the lens arrays are significantly different. While the Hartmann-Shack devices employ microlenses with small spacing (approximately 100 µm) and a large relative aperture (or f-number) (approximately $f_\#$~25), as mentioned above, the microscope proposed by the first aspect of the present invention employs lens arrays with large spacing (preferably of or around 1000 µm) and a small relative aperture (preferably of or around $f_\#$~6).

The microscope of the present invention enables obtaining results that are unattainable with Hartmann-Shack technology, such as the measurement of slight and non-slight variations in the wavefront from biological samples, or the obtaining of 3D images with a higher resolution than that provided by the host microscope in which that proposed by the first aspect of the present invention can be implemented, for an embodiment, thanks to the specific conditions of the spacing between the centres of each two contiguous lenses of the ordered two-dimensional arrangement of lenses and their relative aperture, which differ significantly from the usual conditions employed in the state of the art.

Different types of geometry for the ordered two-dimensional arrangement of lenses are valid, and are embraced by the microscope of the first aspect of the present invention, although this should preferably follow a hexagonal lattice geometry or a square matrix geometry.

Advantageously, the illumination means are configured to illuminate the sample with partially or totally coherent light, and for a preferred embodiment, with a beam of light with a width such that, in the absence of a sample or for a transparent sample, the object wavefront will be completely flat, and the capture in the capture space will be exclusively the light field given by a central lens of said ordered two-dimensional arrangement of lenses.

In accordance with an embodiment, which benefits from the particular ordered two-dimensional arrangement of lenses, and particularly of their spacing $p_\mu$ and their relative aperture, the computational entity (or entities) is configured to perform the following double sampling in two reciprocal spaces:
- a first sampling, or angular sampling, in the space where the ordered two-dimensional arrangement of lenses is located, to obtain the angular information of the object wavefront, the computational entity determining the same, and therewith its spatial frequency content, depending on the position or positions in the capture space where the image sensor receives and acquires said light emitted by the sample, subsequent to crossing the microscope objective lens and the ordered two-dimensional arrangement of lenses; and
- a second sampling, or spatial sampling, in the capture space to obtain the spatial information from the intensity received by each photodetector element, or pixel, of the image sensor.

In general, each photodetector element, or pixel, of the image sensor meets the following restriction:

$$\Delta x \leq \frac{\lambda f_\mu}{p_\mu}$$

where $\Delta x$ is the size of the pixel, $\lambda$ is the wavelength of the beam of light with which the illumination means illuminate said sample, $f_\mu$ is the focal length of the lenses of said ordered two-dimensional arrangement of lenses, and $p_\mu$ is the spacing between the centres of each two contiguous lenses of said lenses.

In accordance with an embodiment, the computational entity is configured to perform a transposition of one of the two reciprocal spaces in order to locate both pieces of information, spatial and angular, in the same space, or reconstruction space, located virtually on the object space, wherein said reconstruction space consists of LIN regions, where L is the number of photodetector elements, or pixels, of the image sensor, and N is the number of lenses of the ordered two-dimensional arrangement of lenses, so that a single local sampling of plane waves of the object wavefront is performed, which includes the aforementioned spatial sampling with a period of $\Delta x/M$, where $M=-f_\mu/f_{ob}$ and $f_{ob}$ is the focal length of the microscope objective lens, and the aforementioned angular sampling with a period of $p_\mu/f_{ob}$.

For an implementation of said embodiment, the computational entity is configured, for the performance of the aforementioned computational reconstruction, to interpret the aforementioned reconstruction space as a synthetic capture system wherein an ordered two-dimensional arrangement of lenses having a spacing $\Delta x/M$ between the centres of each two contiguous lenses is located, in such a way that for each spatial sampling position l, the object wavefront $o(x)$ is sampled locally, so that the intensity of the light received in each photodetector element or pixel $I_{lm}$, represents a measurement of the angular composition of the object wavefront.

In accordance with an embodiment, in order to perform the aforementioned computational reconstruction, the computational entity is configured to consider that in each sub-region of the transposed space, that is, the reconstruction space, a local sampling is performed on plane waves of the object wavefront, where each pixel of a sub-region of the transposed space corresponds to a direction of propagation of the plane waves forming the object wavefront in said area.

Likewise, the computational entity, in accordance with an implementation of said embodiment, is also configured to determine, for a sub-region given by the superscript l, the complex amplitude of the object wavefront, in accordance with the following expression:

$$O^l = \sum_{m=-N/2}^{N/2} \sum_{n=-N/2}^{N/2} I_{mn}^l \exp[ik_{mn}]$$

where $I_{mn}^l$ is the intensity of the pixel corresponding to the position m,n within the sub-region l and $k_{mn}$ the direction vector of the plane wave corresponding to the pixel located at position m,n.

In accordance with an embodiment, the computational entity is configured to transfer the information contained in each pixel to a plane wave database where each position of the pixel represents a direction of propagation of the object wavefront, and advantageously, to carry out the aforementioned computational reconstruction by adding, for each sub-region of the transposed space, the contribution of the different angular components expressed in the plane wave database, to provide a greyscale image, where the resulting shade of grey represents a quantitative measurement of the object wavefront.

For an embodiment, the computational entity is operatively connected to an extensive incoherent light source and to the image sensor in order to control both, and is configured to perform a prior calibration process (that is, prior to proceeding with the performance of the quantitative measurements of a sample), for the characterisation and parametrisation of the capture space, in accordance with the following sequence:
- controlling the extensive incoherent source to illuminate the object space, in such a way that all the lenses of the ordered two-dimensional arrangement of lenses are illuminated,
- controlling the image sensor in order to acquire, under said extensive incoherent illumination, an image of the sample, and
- applying an image-processing circle-detection algorithm in order to provide the following parameters: relative position and size of the lenses of the ordered two-dimensional arrangement of lenses, and the number of pixels contained in the sub-regions delimited by each lens of the ordered two-dimensional arrangement of lenses.

In accordance with an embodiment, the computational entity is configured to perform the aforementioned parametrisation of the capture space, determining and providing the angular dimensions to the capture space by means of the parameters obtained during the calibration process, and depending on the size of the pixels of the image sensor, which is known by the computational entity.

In a second aspect, the present invention also relates to a method for the computational reconstruction of the wavefront, comprising the performance of the functions for which the computational entity of the microscope of the first aspect of the invention is configured, for any of its embodiments. That is, all the functional characteristics described above following the expression "the computational entity is configured to" describe steps of the method of the second aspect of the present invention, for corresponding embodiments.

In a third aspect, the present invention relates to a computer program for the computational reconstruction of the wavefront, including program instructions which, when executed in a processor, implement the method of the second aspect.

In a fourth aspect, the present invention relates to a computer program product comprising a tangible medium in which the computer program of the third aspect is stored.

The microscope of the present invention, due to the conditions of the same, whose nature and effects are to be described below, enables the obtaining of results unattainable with the aforementioned Hartmann-Shack technology.

On the one hand, the number of pixels of the reconstruction of the wavefront of the microscope of the present invention can be significantly greater than that of an H-S, as it is not governed by the size of the lenses (in this case, the size of the lenses of the ordered two-dimensional arrangement is preferably in the region of mm; for this reason, they will be called "millilenses"). In the microscope of the present invention, the number of pixels of the reconstruction of the wavefront is obtained by dividing the number of pixels of the sensor by the number of millilenses. If, for instance, in an embodiment, the microscope of the present invention had five millilenses in a transversal direction (e.g. horizontally or in a direction x) and a sensor of 2,500 pixels in said direction, the final reconstruction would have 500 pixels in said direction. Should it be desired to have an H-S sensor with the same number of pixels, for a typical size of sensor of approximately 6.0×6.0 mm, it would be necessary to have microlenses of d=12 μm. As explained in the previous section, this size is far from the practical limit.

It must be borne in mind that in the microscope of the present invention, the spatial resolution is determined by the transposition ratio. For the case of a microscope with moderate magnification, e.g. $M_{mic}$=10 (scientific microscopes operate with magnifications of up to $M_{mic}$=100), the spatial resolution of the system, if a pixel size of $\Delta x$=6 μm is considered, would be 0.6 μm. That is, said system improves the spatial resolution by three orders of magnitude in comparison with a typical H-S sensor (whose resolution, let us not forget, is determined by the size of the microlenses, and is therefore in the region of 100 to 150 μm).

On the other hand, the maximum angle of the plane waves that can be sampled by the microscope of the present invention is determined by $$\sin e\theta_{max} = N \frac{p_\mu}{2 f_{ob}}$$

where N is the number of millilenses in the corresponding sampling direction, $p_\mu$ is the size of the millilenses, and $f_{ob}(mm)=200/M_{mic}$. Considering typical values, e.g. $p_\mu$=1 mm, $f_{ob}$=12 mm and N=5, the maximum angle that could be sampled would be $\theta_{max}$=15°. Therefore, the microscope of the present invention enables the measurement, for the locally plane waves forming the wavefront, of inclinations between 15 and 30 times greater than an H-S.

The present invention represents a compact, low-cost solution for the measurement of the wavefront scattered by microscopic samples. It represents a much stabler, much simpler system than those based on interferential detection, while improving considerably the spatial resolution with respect to systems based on Hartmann-Shack detectors.

Due to the fact that it requires the incorporation of few optical elements with regard to a conventional microscope, its development in the form of a module adaptable to a commercial microscope is relatively simple.

Said module is therefore proposed as a fifth aspect, incorporating at least the ordered two-dimensional arrangement of lenses and the image sensor of the microscope of the first aspect of the present invention, as well as a support for supporting the same and an optical-mechanical coupling tube adapted to be coupled (optically and mechanically) to a camera port of a microscope.

A sixth aspect of the present invention relates to a kit for a microscope comprising the module for a microscope of the fifth aspect, and an illumination module comprising the illumination means of the microscope of the first aspect of the present invention, adapted to be coupled to an illumination port of a microscope.

The present invention has a potential application in various fields of science and technology. On the one hand, it has a direct application in any field requiring quantitative information on microscopic samples in a non-invasive manner, that is, without requiring a dye in order to observe the different structures forming the sample. For this reason, its use in histology is of particular interest. Likewise, it is possible to apply the present invention in metrology and in the study of microelectromechanical systems (MEMS), particularly the behaviour of said systems with regard to temperature, given the stability of the proposed measurement system with respect to temperature.

BRIEF DESCRIPTION OF THE DRAWINGS

The foregoing and other advantages and characteristics will be better understood in view of the following detailed description of embodiments made with reference to the accompanying drawings, which are to be taken as illustrative and non-exhaustive, wherein.

DETAILED DESCRIPTION OF SOME EMBODIMENTS

Figure 1:
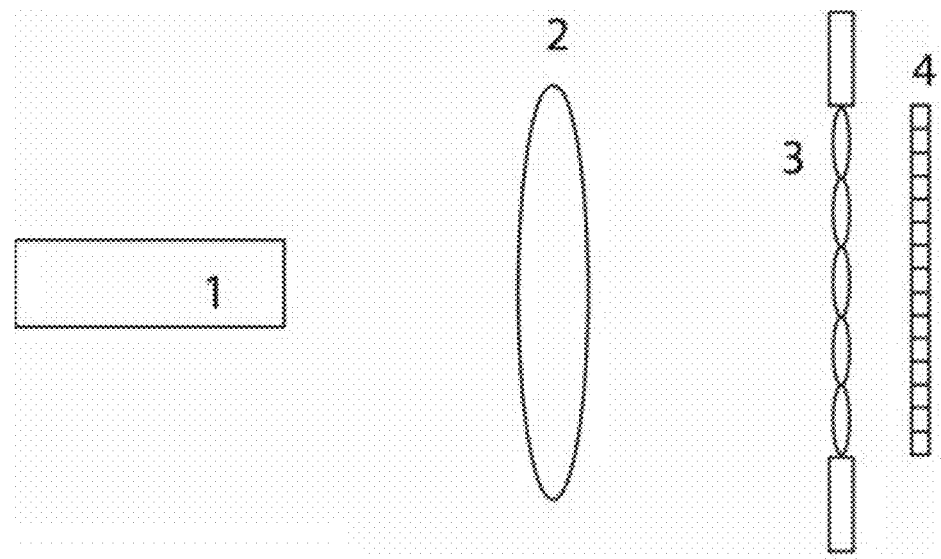
FIG. 1 shows a diagram of the microscope proposed by the first aspect of the present invention, for an embodiment.

As illustrated schematically in FIG. 1, for its most basic embodiment the microscope proposed by the first aspect of the present invention comprises:

- illumination means comprising a partially or totally coherent light source 1, to illuminate a sample T (illustrated schematically in FIG. 5);
- a microscope objective lens 2 configured and arranged to receive and focus the light scattered by the sample T when illuminated by said illumination means 1;
- an ordered two-dimensional arrangement of lenses 3 located at the aperture diaphragm of said microscope objective lens 2 or at the location of an intermediate image thereof;
- an image sensor 4, or pixelated sensor, formed by a plurality of photodetector elements or pixels, located at a capture space on the focal plane of the ordered two-dimensional arrangement of lenses or lens matrix 3, to receive the light scattered by the sample T subsequent to crossing the microscope objective lens 2 and the ordered two-dimensional arrangement of lenses 3, and to acquire spatial and angular information on the object wavefront associated with the light from the sample T, several of the photodetector elements facing each lens; and
- at least one computational entity (not illustrated) operatively connected to the image sensor 4, and configured and arranged to perform a computational reconstruction of the object wavefront based on the spatial and angular information.

As indicated in a previous section, the spacing $p_\mu$ between the centres of each two contiguous lenses of the ordered two-dimensional arrangement of lenses 3 is preferably of or around 1000 μm, and its relative aperture has a value of or around 6.

Figure 2:
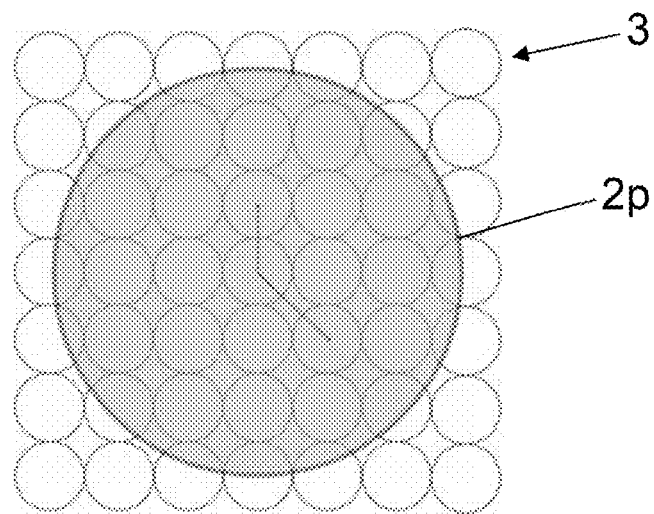
FIG. 2 shows the arrangement of the matrix or ordered two-dimensional arrangement of lenses of the microscope proposed by the first aspect of the invention, superimposed over the pupil of the objective lens thereof.

FIG. 2 shows the arrangement of the matrix or ordered two-dimensional arrangement of lenses 3 of the microscope proposed by the first aspect of the invention, superimposed over the pupil of the lens thereof. Each millilens is characterised by the position of the centre thereof with regard to the origin of coordinates.

The ideal configuration of the microscope meets the following conditions (other configurations may be used provided that the due alterations produced in the complex amplitude of the field when crossing the components of the microscope are borne in mind):

1) The position of the millilens matrix 3 corresponds to the position of the aperture diaphragm of the microscope objective lens 2 or with that of any intermediate image thereof.

2) The geometry in which the lenses of the matrix 3 are arranged determines the fill factor at the aperture diaphragm. The two most common geometries in which the millilenses are arranged are in a square matrix (the centres of the millilenses are located at the nodes of a two-dimensional square lattice) or in a hexagonal lattice. However, any other geometry is valid provided that the positions of the nodes of the lattice are known.

3) The light source 1 provides a uniform, collimated beam (or at least with low divergence) on the microscopic sample T. The width of the beam B (see FIG. 5) is such that, in the absence of a sample, the image recorded by the sensor presents a uniform field at the area corresponding to the image plane of the central millilens and a total absence of light in the rest, with no overlap between the areas corresponding to different milllilenses.

4) The pixelated sensor 4 is located on the focal image plane of the millilens matrix 3.

Under these conditions, the information captured by the microscope proposed by the first aspect of the present invention represents a double sampling process in two reciprocal spaces, thus simultaneously containing spatial and angular information. The existence of a Fourier transformation ratio between the spatial information and the angular information gives rise to the following restriction on pixel size:

$$\Delta x \le \frac{\lambda f_\mu}{p_\mu}$$

where $\Delta x$ is the size of the pixel, $\lambda$ is the wavelength of the beam of light with which the illumination means 1 illuminate the sample T, $f_\mu$ is the focal length of the millilenses, and $p_\mu$ is the spacing between the centres or nodes of each two contiguous millilenses of the matrix 3.

The distribution of the intensities in the field detected by the sensor can be expressed mathematically as:

$$I(l) = \left| \text{rect}\left(\frac{l\Delta x}{L \cdot \Delta x}\right) \frac{1}{p_\mu} \exp\left(\frac{j\pi}{\lambda f_\mu}(l\Delta x)^2\right) \left\{ o\left(\frac{l\Delta x}{M}\right) \otimes h\left(\frac{l\Delta x}{\lambda f_\mu}\right) \otimes \left[ h_\mu\left(\frac{l\Delta x}{\lambda f_\mu}\right) \sum_{n=-\infty}^{\infty} \delta\left(l\Delta x - n\frac{\lambda f_\mu}{p_\mu}\right) \right] \right\} \right|^2$$

In this equation, l represents the l-th pixel of the sensor, the function h(•) represents the 2D impulse response of the microscope objective lens (generally an Airy disc) and $h_\mu$(•) that of the millilens matrix (generally a matrix of Airy discs, in the case of millilenses with a circular aperture). These impulse responses are determined by the diffraction of waves, and functionally are proportional to the Fourier transform of the corresponding aperture. Besides, the function o(•) represents the distribution of amplitudes of the wavefront to be measured, $M=-f_\mu/f_{ob}$ y $f_{ob}$ the lateral magnification of the microscope, $f_{ob}$ the focal length of the microscope objective lens, and L the number of pixels of the sensor. Finally, the function rect(•) is a binary function with a value of 1 in the interior of a rectangle and a value of 0 outside the same, and δ(•) is the Dirac delta function, This expression highlights, in the microscope and the method of the present invention, the existence of a double sampling of the complex amplitude distribution of the object, o(•), limited in resolution by diffraction, as in any aberration-free optical system.

In combination with the specific configuration and arrangement of the components of the microscope of the first aspect of the present invention, and based on the same, a new reconstruction software is proposed, to be implemented by the computational entity and by the method of the second aspect of the invention, whose first task consists of detecting the positions of the images provided by the matrix of millilenses 3 on the plane of the image sensor 4. These positions define different regions of the frequency content forming the spectrum of the object. The spacing between millilenses defines the periodicity of the frequency sampling.

On the other hand, the pixelated sensor performs a second sampling, but this time on the spatial content. Given that this sampling and the previous one are performed in reciprocal spaces, it is possible to perform a duly scaled transposition of either, so as to locate both pieces of information in the same space. Said transposition may be understood in the following way:

- The sensor samples the spatial information with a periodicity of $\Delta x$. However, said sampling is performed on a field previously sampled by the matrix of millilenses 3 in its reciprocal space, with a periodicity of $p_\mu$. The product of spatial resolution×bandwidth (also known as "space-bandwidth product" (SBP) in the scientific literature), determines the amount of information captured by an optical system. In the present invention, the matrix of millilenses 3 is the limiting factor; therefore, the SBP is determined by $N \cdot p_\mu$, N being the total number of millilenses that can fit into the pupil of the objective lens and which therefore provide images on the image sensor 4.
- The transposition of the spatial-angular information captured with the microscope proposed gives rise to a new expression of this information wherein an exchange of the periodicity of the samplings is produced, in such a way that the new pixelated matrix represents a local sampling of plane waves of the wavefront scattered by the object. Now, the period of the spatial sampling is $\Delta x/M$ and that of the angular sampling is $p_\mu/f_{ob}$.

Figure 3:
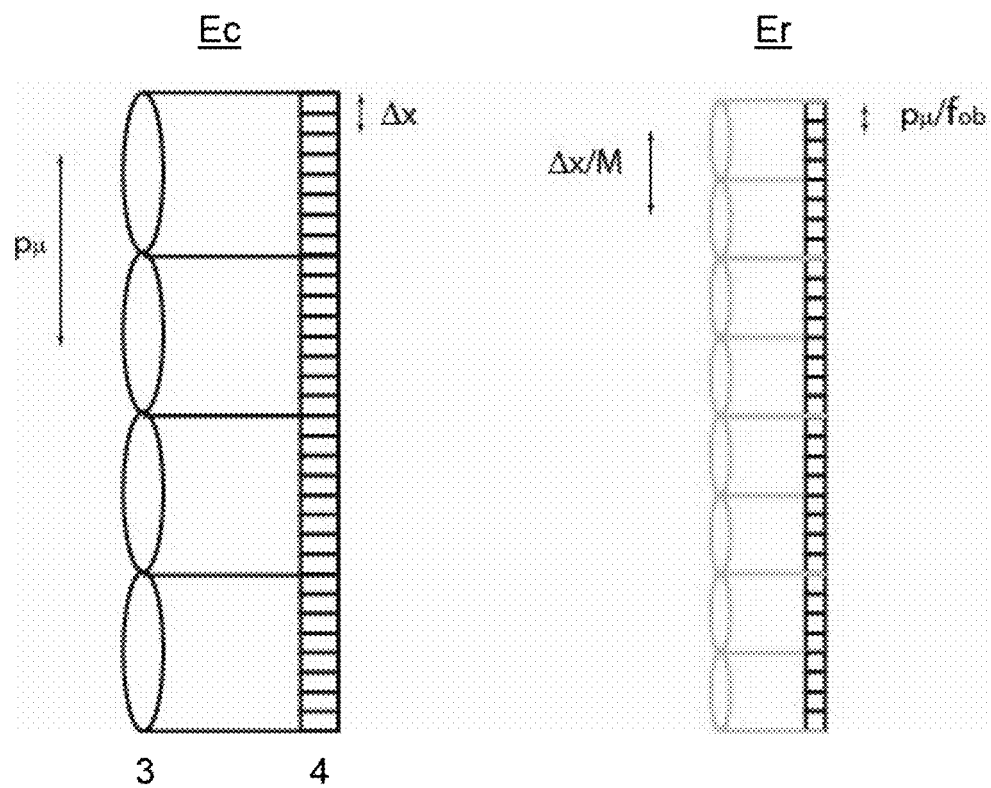
FIG. 3 is a schematic illustration of the transposition ratio between the capture space and the reconstruction space, performed by the computational entity of the microscope of the first aspect of the present invention, for an embodiment thereof and of the method of the second aspect of the invention.
Figure 5:
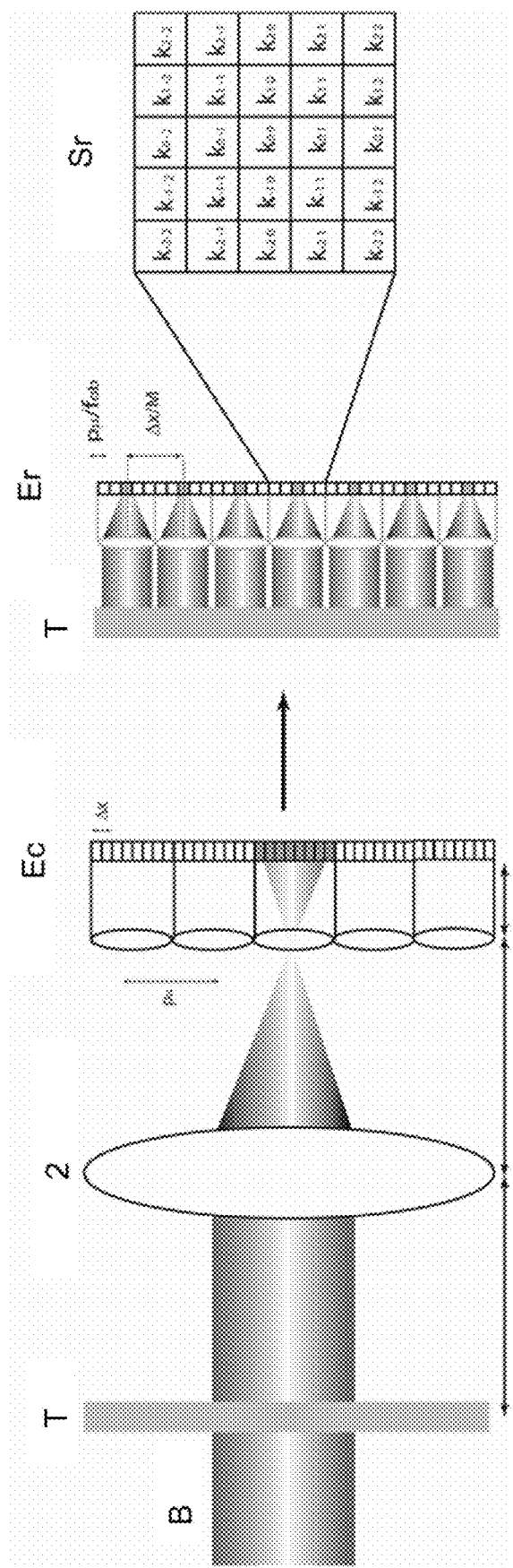
FIG. 5 is a schematic representation of the capture, transposition and reconstruction performed by the microscope of the first aspect of the present invention and in accordance with the method of the second aspect of the invention, for an embodiment.

Thus, the space known as "reconstruction space Er" (whose transposed space is the c space) is defined, and is located virtually on the object space or capture space Ec (see FIGS. 3 and 5). The latter consists of LIN regions, whose position is determined by the periodicity of the new spatial sampling. Within each region, a total of N angles are sampled with a precision depending on the periodicity of the angular sampling in the reconstruction space Er, as shown in FIG. 3, where the transposition ratio between the capture space Ec and the reconstruction space Er is illustrated.

Said space may be interpreted as a synthetic capture system in which a number of microlenses with a spacing of $\Delta x/M$ are placed directly on the plane whereon the sample is located. Thus, for each spatial sampling position, l, the object wavefront o(x) is sampled locally, in such a way that the intensity of each pixel $I_{lm}$ represents a measurement of the angular composition of the object wavefront. If the object wavefront is interpreted as an overlaying of plane waves, the sum of the local measurements for each spatial sampling region l, duly scaled with the intensity and the corresponding angular component, represents a sampled version of said wavefront:

$$O_l = \sum_{n=-N/2}^{N/2} I_{lm} \exp\left[i2\pi\left(\frac{p_\mu}{f_{ob}}\right)m\right]$$

For a given microscope objective lens, the precision in the measurement of the angular components of the wavefront depends on the size and number of millilenses in the capture space.

A more detailed explanation is given below, with reference to FIG. 5, of the capture, transposition and reconstruction process performed with the microscope of the first aspect of the present invention and in accordance with the method of the second aspect of the invention, for an embodiment, for a beam of light B which illuminates a sample T behind which are arranged, in the capture space Ec, the matrix of lenses 3 and the image sensor 4, illustrating schematically a representation of the reproduction space Er.

It is possible to consider that each sub-region Sr of the transposed or reconstruction space Er performs a local sampling on the plane waves of the object wavefront. Each pixel of a sub-region Sr of the transposed space Er corresponds to a direction of propagation of the plane waves comprising the object wavefront in said area. It may be considered that for a given sub-region Sr indicated by the superscript l, the complex amplitude of the object wavefront is determined by:

$$O^l = \sum_{m=-N/2}^{N/2} \sum_{n=-N/2}^{N/2} I^l_{mn} \exp[ik_{mn}]$$

$I_{mn}^l$ being the intensity of the pixel corresponding to the position m,n within the sub-region Sr, and $k_{mn}$ the direction vector of the plane wave corresponding to the pixel located at position m,n.

For example, on illuminating a completely transparent sample T, as shown in the figure, the wavefront will be completely flat, and the record in the capture space Ec will be exclusively the field given by the central millilens. On performing the transposition, each sub-region Sr will have only a single component, given by the element $k_{00}$. Said element corresponds to a plane wave travelling in the direction of the optical axis. In this way, from all the sub-regions Sr, a totally flat wavefront would be formed, this being that corresponding to the sample T. Said elements are physically related to plane waves via the system parameters in the following way:

$$k_{mn} = \exp\left(i2\pi\left[m\left(\frac{p_\mu}{f_{ob}}\right) + n\left(\frac{p_\mu}{f_{ob}}\right)\right]\right)$$

Figure 4:
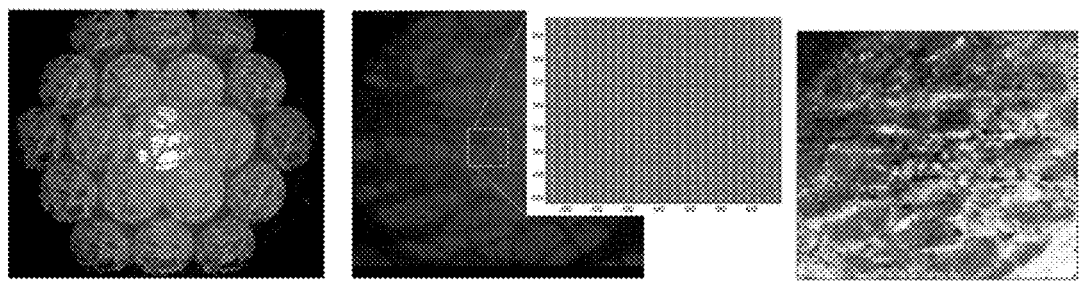
FIG. 4 shows a series of images as an example of a proof-of-concept experiment of the use of the microscope of the first aspect of the invention, for the computational reconstruction of a sample consisting of a number of cotton fibres.

FIG. 4 shows a preliminary result as an example of the operation of the microscope and method of the present invention. Said result was obtained with a non-optimised low-resolution microscope and with a sample of cotton fibres; however, it shows the potential of the concept presented in this invention. The panel of the left-hand side of said figure shows the capture obtained by a microscope such as that proposed by the invention. On performing the transposition, a matrix is obtained which represents the reconstruction space Er (central panel of FIG. 4). Finally, from the processing of the local contributions to the wavefront given by the pixels of the sub-regions, the object wavefront is obtained (FIG. 4, right-hand panel).

Figure 6:
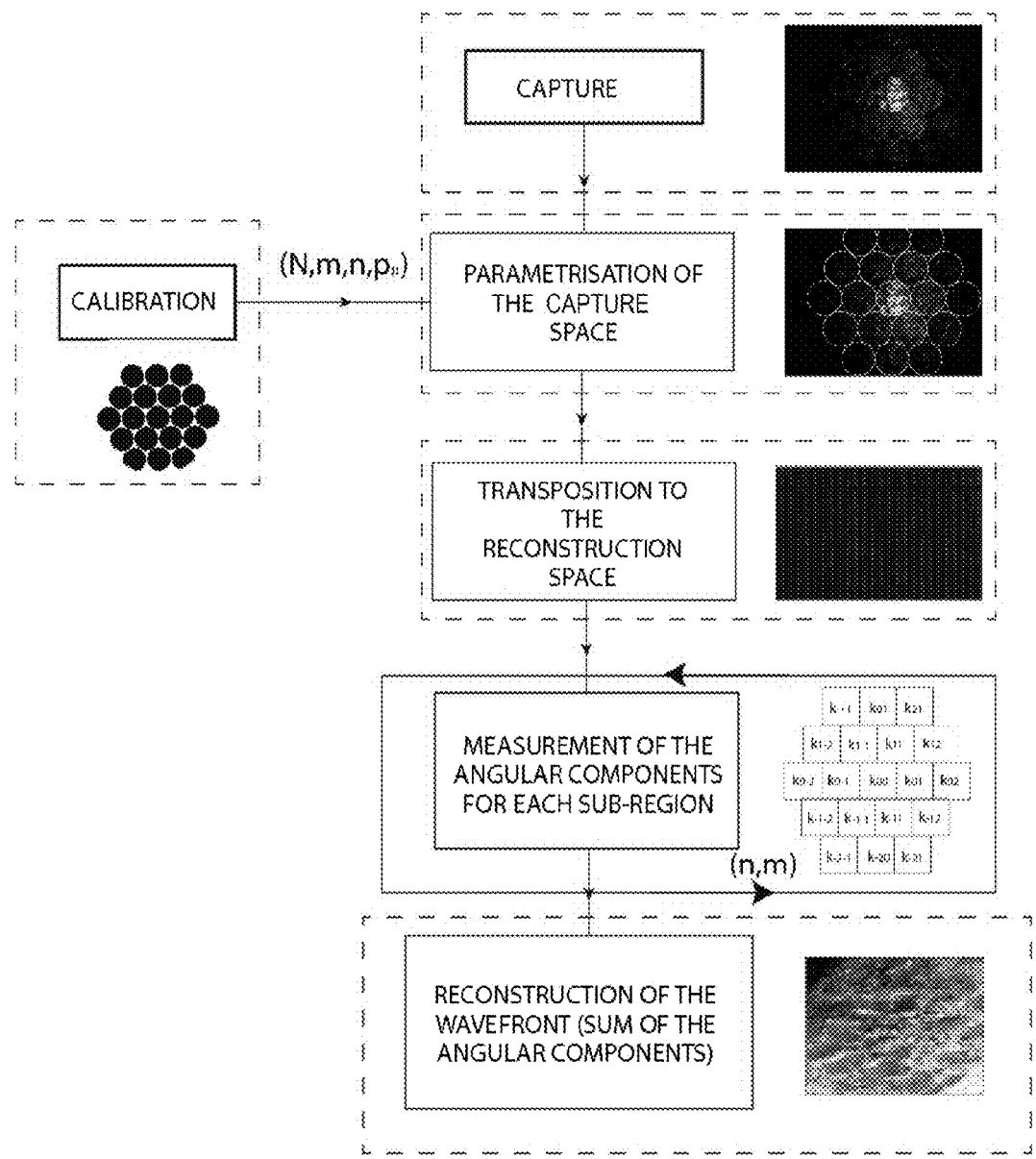
FIG. 6 shows a flow diagram of the operative steps to be followed by means of the microscope and the method proposed by the present invention, for an embodiment.

FIG. 6 shows a flow diagram illustrating the steps of the method proposed by the second aspect of the present invention, or in other words, the functions for which the computational entity of the microscope of the first aspect of the invention is configured, for an embodiment; these are described below in correspondence with the legends included in each block.

CAPTURE: Capture obtained by the pixelated sensor 4.

CALIBRATION: Calibration is a necessary process in the characterisation and parametrisation of the capture space Ec. For the same set-up, it is only necessary to perform this process a single time. To do this, the object space is illuminated with an extensive incoherent source, in such a way that all the lenses of the matrix 3 are illuminated. Subsequently, the image obtained is saved and an image-processing circle-detection algorithm is applied. Said algorithm provides all the necessary parameters: relative position and size of the lenses, and the number of pixels contained in the sub-regions delimited by each lens.

PARAMETRISATION OF THE CAPTURE SPACE: By means of the parameters obtained during the calibration, and the size of the pixels of the sensor 4 being known, the due angular dimensions are conferred to the capture space Ec.

TRANSPOSITION TO THE RECONSTRUCTION SPACE: A transposition is applied to the capture space Ec), using the parametrisation data. Therewith, a reconstruction space Er is obtained, formed by a series of sub-regions Sr wherein each pixel represents an angular propagation direction of the wavefront.

MEASUREMENT OF THE ANGULAR COMPONENTS FOR EACH SUB-REGION: The information contained by each pixel is transferred to a database of plane waves wherein each pixel position represents a propagation direction of the wavefront.

RECONSTRUCTION OF THE WAVEFRONT: For each sub-region, the contribution of the different angular components expressed in a database of plane waves is added up. The resulting shade of grey represents a quantitative measurement of the wavefront.

Figure 7:
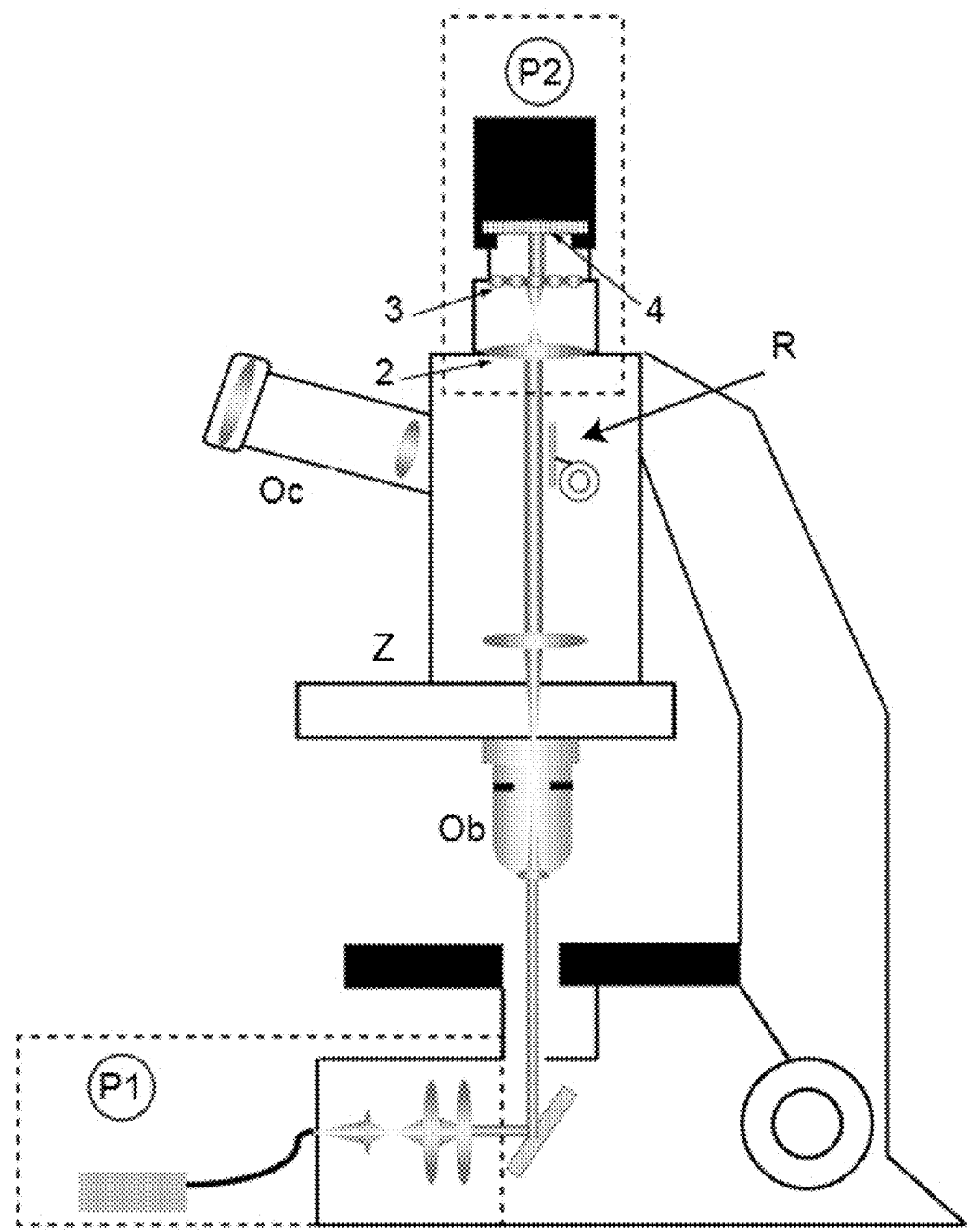
FIG. 7 schematically illustrates the kit for a microscope proposed by the sixth aspect of the present invention with two couplings, one for the camera port, for the module of the fifth aspect of the invention; and the other for the illumination port, for the illumination means of an illumination module of the kit, of a conventional microscope.

Finally, FIG. 7 shows schematically the kit for a microscope proposed by the sixth aspect of the present invention, including the module of the fifth aspect coupled to the camera port of a commercial microscope, including respectively the eyepiece Oc, objective lens Ob, tube lens Z and folding mirror R; likewise an illumination module including illumination means coupled to the illumination port of the microscope.

The kit adaptable to a commercial microscope consists of two parts marked in the diagram in FIG. 7 with a dashed line.

P1) Illumination module: It is necessary to adapt to the illumination port an illumination means, generally a laser and a set of lenses producing the illumination described in the present document P2) Module of the fifth aspect of the invention, or collection module: The matrix of lenses 3, the sensor 4 and an auxiliary lens 2 (or a set of auxiliary lenses) are adapted to the camera port of the microscope in such a way that the field collected by the sensor 4 has the characteristics defined in the invention.

The main advantage of the microscope proposed by the present invention lies in that due to fact that the physical capture is performed in the transposed space, the resolution of the synthetic microlenses of the reconstruction space Er is not limited by diffraction, but by the spacing between the pixels of the camera or image sensor 4. This fact enables the provision of a quantitative measurement of phases with an unprecedented lateral resolution.

A person skilled in the art could make changes and modifications to the embodiments described herein without departing from the scope of the invention as defined in the appended claims.

The invention claimed is:

1. A microscope for quantitative measurements of an object wavefront, comprising:
   an illumination mechanism for the illumination of a sample;
   a microscope objective lens configured and arranged to receive and focus the light scattered by the sample when illuminated by said illumination mechanism;
   an ordered two-dimensional arrangement of lenses located at an aperture diaphragm of said microscope objective lens or at a location of an intermediate image thereof;
   an image sensor formed by a plurality of photodetector elements, located at a capture space on a focal plane of the ordered two-dimensional arrangement of lenses, to receive said light scattered by the sample subsequent to crossing said microscope objective lens and said ordered two-dimensional arrangement of lenses, and to acquire spatial information and angular information of the object wavefront associated with said light from said sample, several of said photodetector elements facing each lens; and
   at least one computational entity, operatively connected to said image sensor, and configured and arranged to perform a computational reconstruction of said object wavefront based on said spatial and angular information;
   wherein the spacing $p_{s2}$ between the centres of each two contiguous lenses of said ordered two-dimensional arrangement of lenses is greater than 500 μm and its relative aperture is less than 10.

2. The microscope of claim 1, wherein the spacing between the centres of each two contiguous lenses of said ordered two-dimensional arrangement of lenses has a value between 900 μm and 1100 μm, and its relative aperture has a value between 5 and 7.

3. The microscope of claim 2, wherein the spacing between the centres of each two contiguous lenses of said ordered two-dimensional arrangement of lenses has a value between 990 μm and 1010 μm, preferably 1000 μm, and its relative aperture has a value between 5.8 and 6.2, preferably 6.

4. The microscope of claim 1, wherein said light illumination mechanism is configured to illuminate said sample with partially or totally coherent light.

5. The microscope of claim 4, wherein said illumination mechanism is configured to illuminate said sample with a beam of light with a width such that, in the absence of a sample or for a transparent sample, the object wavefront will be completely flat, and the capture in the capture space will be exclusively the light field given by a central lens of said ordered two-dimensional arrangement of lenses.

6. The microscope of claim 1, wherein said at least one computational entity is configured to perform the following double sampling in two reciprocal spaces:
   a first sampling, or angular sampling, in the space where the ordered two-dimensional arrangement of lenses is to located, to obtain the angular information on the object wavefront, the computational entity determining the same, and therewith its spatial frequency content, depending on the position or positions in the capture space where the image sensor receives and acquires said light emitted by the sample, subsequent to crossing the microscope objective lens and the ordered two-dimensional arrangement of lenses; and a second sampling, or spatial sampling, in the capture space to obtain the spatial information from the intensity received by each photodetector element, or pixel, of the image sensor.

7. The microscope of claim 6, wherein the size of each photodetector element, or pixel, of said image sensor meets the following restriction:

$$\Delta x \leq \frac{\lambda f_\mu}{p_\mu}$$

where $\Delta x$ is the size of the pixel, $\gamma$ is the wavelength of the beam of light with which the illumination mechanism illuminate said sample, $f_\mu$ is the focal length of the lenses of said ordered two-dimensional arrangement of lenses, and $p_\mu$ is the spacing between the centres of each two contiguous lenses of said lenses.

8. The microscope of claim 7, wherein said at least one computational entity is configured to perform a transposition of one of said two reciprocal spaces in order to locate both pieces of information, spatial and angular, in the same space, or reconstruction space, located virtually on the object space, wherein said reconstruction space consists of L/N regions, where L is the number of photodetector elements, or pixels, of the image sensor, and N is the number of lenses of the ordered two-dimensional arrangement of lenses, so that a single local sampling of plane waves of the object wavefront is performed, which includes said spatial sampling with a period of $\Delta x/M$, where $M=-f_\mu/f_{ob}$ and $f_{ob}$ is the focal length of the microscope objective lens, and said angular sampling, with a period of $p_\mu/f_{ob}$.

9. The microscope of claim 8, wherein the at least one computational entity is configured, for the purpose of performing said computational reconstruction, to interpret said reconstruction space as a synthetic capture system wherein an ordered two-dimensional arrangement of lenses having a spacing $\Delta x/M$ between the centres of each two contiguous lenses is located, in such a way that for each spatial sampling position l, the object wavefront o(x) is sampled locally, so that the intensity of the light received in each photodetector element or pixel $I_{lm}$, represents a measurement of the angular composition of the object wavefront.

10. The microscope of claim 9, wherein in order to perform said computational reconstruction, the at least one computational entity is configured to consider that in each sub-region of the reconstruction space a local sampling is performed on plane waves of the object wavefront, wherein each pixel of a sub-region of the reconstruction space corresponds to a direction of propagation of the plane waves forming the object wavefront in said area.

11. The microscope of claim 10, wherein the at least one computational entity is configured to determine, for a sub-region given by the superscript 1, the complex amplitude of the object wavefront in accordance with the following expression:

$$O^l = \sum_{m=-N/2}^{N/2} \sum_{n=-N/2}^{N/2} I^l_{mn} \exp[ik_{mn}]$$

where $I^l_{mn}$ is the intensity of the pixel corresponding to the position m,n within the sub-region I and $K_{mn}$ the direction vector of the plane wave corresponding to the pixel located at position m,n.

12. The microscope of claim 10, wherein the at least one computational entity is configured to transfer the information contained in each pixel to a database of plane waves wherein each position of the pixel represents a direction of propagation of the object wavefront.

13. The microscope of claim 12, wherein the at least one computational entity is configured to carry out said computational reconstruction by adding, for each sub-region of the reconstruction space, the contribution of the different angular components expressed in said database of plane waves, to yield a greyscale image, where the resulting shade of grey represents a quantitative measurement of the object wavefront.

14. The microscope of claim 10, wherein the at least one computational entity is operatively connected to an extensive incoherent light source and to said image sensor in order to control both, and is configured to perform a prior calibration process for the characterisation and parametrisation of the capture space, controlling said extensive incoherent light source to illuminate the object space, so that all the lenses of the ordered two-dimensional arrangement of lenses are illuminated, controlling said image sensor in order to obtain, under said extensive incoherent illumination, an image of the sample, and applying an image-processing circle-detection algorithm in order to provide all the following parameters: relative position and size of the lenses of the ordered two-dimensional arrangement of lenses, and the number of pixels contained in the sub-regions delimited by each lens of the ordered two-dimensional arrangement of lenses.

15. The microscope of claim 14, wherein the at least one computational entity is configured to perform said parametrisation of the capture space, determining and providing the angular dimensions to the capture space by means of the parameters obtained during the calibration process, and depending on the size of the pixels of the image sensor.

16. The microscope of claim 1, wherein said ordered two-dimensional arrangement of lenses follows a hexagonal lattice geometry.

17. The microscope of claim 1, wherein said ordered two-dimensional arrangement of lenses follows a square matrix geometry.

18. A method for the computational reconstruction of the wavefront, comprising the performance of the functions for which the at least one computational entity of the microscope as claimed in claim 1 is configured.

19. A computer program product for the computational reconstruction of the wavefront, comprising a tangible medium and, stored therein, a computer program including program instructions which, when executed in a processor, implement the method of claim 18.

20. A module for a microscope, comprising at least the ordered two-dimensional arrangement of lenses and the image sensor of the microscope as claimed in claim 1, as well as a support for supporting the same and an optical-mechanical coupling tube adapted to be coupled to a camera port of a microscope.

21. A kit for a microscope, wherein said microscope is a microscope for quantitative measurements of the wavefront that comprises:

an illumination mechanism for the illumination of a sample;

a microscope objective lens configured and arranged to receive and focus the light scattered by the sample when illuminated by said illumination mechanism;

an ordered two-dimensional arrangement of lenses located at the aperture diaphragm of said microscope objective lens or at the location of an intermediate image thereof;

an image sensor formed by a plurality of photodetector elements, located at a capture space on the focal plane of the ordered two-dimensional arrangement of lenses, to receive said light scattered by the sample subsequent to crossing said microscope objective lens and said ordered two-dimensional arrangement of lenses, and to acquire spatial information and angular information of the object wavefront associated with said light from said sample, several of said photodetector elements facing each lens; and at least one computational entity, operatively connected to said image sensor, and configured and arranged to perform a computational reconstruction of said object wavefront based on said spatial and angular information;

wherein the spacing $p_\mu$ between the centres of each two contiguous lenses of said ordered two-dimensional arrangement of lenses is greater than 500 μm and its relative aperture is less than 10;

and wherein the kit for a microscope comprises:

a module for said microscope, comprising at least the ordered two-dimensional arrangement of lenses and the image sensor of the microscope, as well as a support for supporting the same and an optical-mechanical coupling tube adapted to be coupled to a camera port of the microscope; and an illumination module comprising the illumination mechanism of the microscope, adapted to be coupled to an illumination port of the microscope.

* * * * *